US010415199B2

(12) United States Patent
Smothers et al.

(10) Patent No.: US 10,415,199 B2
(45) Date of Patent: Sep. 17, 2019

(54) ANCHORABLE STAND FOR A WATER MOVEMENT DEVICE

(71) Applicants: Jacob Smothers, Huntington, TN (US); Corren Tippitt, Huntingdon, TN (US)

(72) Inventors: Jacob Smothers, Huntington, TN (US); Corren Tippitt, Huntingdon, TN (US)

( * ) Notice: Subject to any disclaimer, the term of this patent is extended or adjusted under 35 U.S.C. 154(b) by 595 days.

(21) Appl. No.: 15/161,554

(22) Filed: May 23, 2016

(65) Prior Publication Data

US 2017/0335531 A1   Nov. 23, 2017

(51) Int. Cl.
| | |
|---|---|
| *E02B 3/00* | (2006.01) |
| *E02B 1/00* | (2006.01) |
| *F04D 13/08* | (2006.01) |
| *F04D 29/60* | (2006.01) |
| *F16M 11/04* | (2006.01) |
| *F04D 29/54* | (2006.01) |

(52) U.S. Cl.
CPC ............ *E02B 1/003* (2013.01); *F04D 13/086* (2013.01); *F04D 29/605* (2013.01); *F04D 29/548* (2013.01); *F16M 11/046* (2013.01)

(58) Field of Classification Search
CPC ...... E02B 1/003; F04D 13/086; F04D 29/605; F04D 29/64; F16M 11/046
USPC .... 248/132, 145, 145.3, 149, 156–158, 161, 248/240, 407, 415, 416, 423–425
See application file for complete search history.

(56) References Cited

U.S. PATENT DOCUMENTS

| | | | | |
|---|---|---|---|---|
| 2,781,920 A | * | 2/1957 | Burington | ............ B25H 1/0007 414/589 |
| 2,991,622 A | | 7/1961 | Oster | |
| 3,007,664 A | * | 11/1961 | Fairbanks | ............. B65F 1/1421 248/126 |
| 3,083,538 A | | 4/1963 | Gross | |
| 3,109,288 A | | 11/1963 | Gross | |
| 3,193,260 A | | 7/1965 | Lamb | |
| 3,318,098 A | | 5/1967 | Hoddinott | |
| 3,320,160 A | | 5/1967 | Wells, Jr. | |
| 3,373,821 A | * | 3/1968 | Sare | ........................ A01K 63/04 261/91 |
| 3,480,250 A | * | 11/1969 | Hankins | .................. F21S 6/006 248/161 |
| 3,540,222 A | | 11/1970 | Mendelson | |
| 3,758,083 A | | 9/1973 | Palmer | |
| 4,030,859 A | | 6/1977 | Henegar | |

(Continued)

*Primary Examiner* — Eret C McNichols
(74) *Attorney, Agent, or Firm* — Pitts & Lake, P.C.; J. Blanchard

(57) ABSTRACT

The present de-icing apparatus provides relatively small, portable, and adjustable devices for the specific purpose of de-icing a relatively small area of surface water for use by outdoor enthusiasts. The anchorable stand provides directional, surface height, and angular adjustment of the de-icing water flow to allow for establishing the preferred de-icing pattern at the water surface. De-icing means the reduction of freezing and the minimization of ice accumulation in a given surface area of the open body of water. The fixed-height vertical member of the anchorable stand provides a 360° adjustment range of output water flow. The adjustable-height vertical member of the anchorable stand provides surface height adjustment of the intake and output water flows. The vertical rotation point or points of the anchorable stand hold the water movement device and provide angular adjustment of the intake and output water flow.

17 Claims, 3 Drawing Sheets

(56) References Cited

U.S. PATENT DOCUMENTS

| | | | |
|---|---|---|---|
| 4,051,810 A | 10/1977 | Breit | |
| 4,065,085 A * | 12/1977 | Gellatly | A47J 33/00 126/30 |
| 4,070,423 A | 1/1978 | Pierce | |
| 4,179,243 A | 12/1979 | Alde | |
| 4,216,091 A | 8/1980 | Mineau | |
| 4,247,261 A | 1/1981 | Springston | |
| 4,279,537 A | 7/1981 | Tweedy | |
| 4,300,855 A | 11/1981 | Watson | |
| 4,302,162 A | 11/1981 | Springston | |
| 4,439,060 A | 3/1984 | Liscio | |
| 4,542,522 A * | 9/1985 | Blais | G03B 42/025 211/173 |
| 4,596,372 A * | 6/1986 | Ford | A47B 23/04 248/157 |
| 4,671,478 A * | 6/1987 | Schoenig | F16B 7/0413 16/19 |
| 4,838,199 A * | 6/1989 | Weber | B05C 13/02 118/500 |
| 4,852,847 A * | 8/1989 | Pagel | A47G 29/1216 248/548 |
| 4,964,606 A * | 10/1990 | Beam | F16M 11/14 248/188.5 |
| 5,203,643 A | 4/1993 | Mork | |
| 5,251,127 A * | 10/1993 | Raab | A61B 17/00 606/130 |
| 5,772,172 A * | 6/1998 | Sampedro | E01F 9/696 248/415 |
| 6,123,498 A * | 9/2000 | Surkin | B60R 9/06 224/509 |
| 6,129,371 A * | 10/2000 | Powell | B60R 9/06 224/502 |
| 6,138,991 A * | 10/2000 | Myers, Jr. | B66C 23/44 212/180 |
| 6,457,683 B1 * | 10/2002 | Armstrong, Sr. | E04H 15/32 248/122.1 |
| 6,701,913 B1 * | 3/2004 | LeDuc | B60R 9/06 126/276 |
| 6,778,763 B1 | 8/2004 | Reusche | |
| 6,921,007 B1 * | 7/2005 | Guerrant | B60R 9/06 224/519 |
| 6,981,834 B1 * | 1/2006 | Henry | B60P 1/5471 212/299 |
| 7,118,080 B2 * | 10/2006 | Chan | A47B 23/046 248/129 |
| 7,150,239 B2 | 12/2006 | Blumenthal | |
| 7,350,770 B1 * | 4/2008 | Boyer | B66C 23/02 212/295 |
| 7,427,221 B2 | 9/2008 | Blumenthal | |
| 7,434,772 B1 * | 10/2008 | Jou | A45D 20/14 248/124.2 |
| 8,041,199 B2 | 10/2011 | Reusche | |
| 8,083,196 B2 * | 12/2011 | Chang | A61B 90/50 248/276.1 |
| 8,272,605 B2 * | 9/2012 | Fuchs | F16B 7/1454 248/122.1 |
| 8,286,843 B2 * | 10/2012 | Bogoslofski | B60R 9/10 224/509 |
| 8,840,304 B2 * | 9/2014 | Perez Zarate | A61B 6/4405 378/197 |
| 9,260,331 B2 | 2/2016 | Park | |
| 9,835,285 B1 * | 12/2017 | Hurley | F16M 11/2007 |
| 2004/0112270 A1 | 6/2004 | Blumenthal | |
| 2004/0206860 A1 * | 10/2004 | Bolinder | E04H 12/2215 248/156 |
| 2006/0150888 A1 | 7/2006 | Blumenthal | |
| 2007/0252068 A1 * | 11/2007 | Secora | A61B 8/12 248/458 |
| 2009/0189030 A1 * | 7/2009 | Krasnicki | A45F 3/44 248/156 |
| 2010/0074686 A1 | 3/2010 | Towley, III | |
| 2010/0090071 A1 * | 4/2010 | Gothard | B05B 13/0285 248/129 |
| 2011/0108698 A1 * | 5/2011 | Chen | E05B 73/0082 248/553 |
| 2011/0163210 A1 * | 7/2011 | Hendey, Sr. | F16L 3/04 248/125.8 |
| 2012/0181407 A1 * | 7/2012 | Nemish | B60C 25/00 248/423 |
| 2012/0182134 A1 * | 7/2012 | Doyle | A61B 1/00149 340/12.22 |
| 2012/0241582 A1 * | 9/2012 | Xu | A61M 5/14 248/419 |
| 2013/0206935 A1 * | 8/2013 | Majid | F16M 11/041 248/124.1 |
| 2014/0057742 A1 * | 2/2014 | Schell | A63B 69/0002 473/429 |
| 2016/0120303 A1 * | 5/2016 | Constantino | F16M 11/42 108/28 |
| 2017/0150018 A1 * | 5/2017 | Luoma | F16M 11/2092 |
| 2018/0228289 A1 * | 8/2018 | Kennedy | A47B 97/04 |
| 2018/0251947 A1 * | 9/2018 | Stone | B01F 7/00741 |
| 2019/0200586 A1 * | 7/2019 | Zhang | A01K 63/047 |

\* cited by examiner

ANCHORABLE STAND FOR A WATER MOVEMENT DEVICE

BACKGROUND

Devices to continuously prevent ice formation on the surface of open bodies of water are desirable for the protection of docks, piers, boats, shores, and other structures from damage by ice. Devices that aerate water from the bottom to the surface of open bodies of water are desirable to prevent the death of fish and other aquatic life. In comparison, outdoor enthusiasts interested in hunting or fishing have a need for temporarily maintaining a de-iced area of an open body of water, but are also concerned with reducing to the extent possible disturbance of the water farther below the surface.

One way of preventing the surface of an open body of water from freezing is through the use of a water circulator that includes a propeller driven by an electric drive motor to prevent freezing of the surface water. Such a device is described in U.S. Pat. No. 4,247,261 to Springston, for example. Unlike when protecting structures from ice damage, outdoor enthusiasts are concerned with ice at the surface of the water, and thus are not interested in devices that move water up from the bottom or that de-ice more than a small area of surface water. Enthusiasts also desire the ability to readily change the direction and intensity of the water flow that is being used to de-ice the water surface.

As evident from the above description, there is an ongoing need for simple and efficient devices for de-icing a relatively small area of surface water that is portable and may be readily adjusted from the surface. The anchorable stand of the present water movement device overcomes at least one of the disadvantages associated with conventional devices designed for fixed-structure and aquatic life protection.

SUMMARY

A de-icing apparatus is provided, for de-icing a surface area of water, the apparatus includes an anchorable stand, the anchorable stand including a fixed-height vertical member, the fixed-height vertical member including an anchoring member and a rotating member, where the anchoring member includes an anchoring end and a rotating member receiving end, where the rotating member receiving end of the anchoring member includes fixed attachment points, and where the rotating member has an outside dimension smaller than an inside dimension of the anchoring member, and the rotating member includes a rotating attachment point. The apparatus also includes an adjustable-height vertical member attached to the fixed-height vertical member with a cross bar, the adjustable-height vertical member includes a fixed receiver and a movable rod, the fixed receiver includes at least one vertically-fixed attachment point and the movable rod includes vertically-movable attachment points. The apparatus also includes a water movement device attached to the anchorable stand through the movable rod.

Other systems, methods, features and advantages of the invention will be, or will become, apparent to one with skill in the art upon examination of the following figures and detailed description. It is intended that all such additional systems, methods, features, and advantages be included within this description, be within the scope of the invention, and be protected by the claims that follow.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

In relation to prior surface water de-icing devices, the present de-icing apparatus provides relatively small, portable, and adjustable devices for the specific purpose of de-icing a relatively small area of surface water for use by outdoor enthusiasts. The anchorable stand provides directional, surface height, and angular adjustment of the de-icing water flow to allow for establishing the preferred de-icing pattern at the water surface. De-icing means the reduction of freezing and the minimization of ice accumulation in a given surface area of the open body of water. The fixed-height vertical member of the anchorable stand provides a 360° adjustment range of output water flow. The adjustable-height vertical member of the anchorable stand provides surface height adjustment of the intake and output water flows. The vertical rotation point or points of the anchorable stand hold the water movement device and provide angular adjustment of the intake and output water flow.

Figure 1:
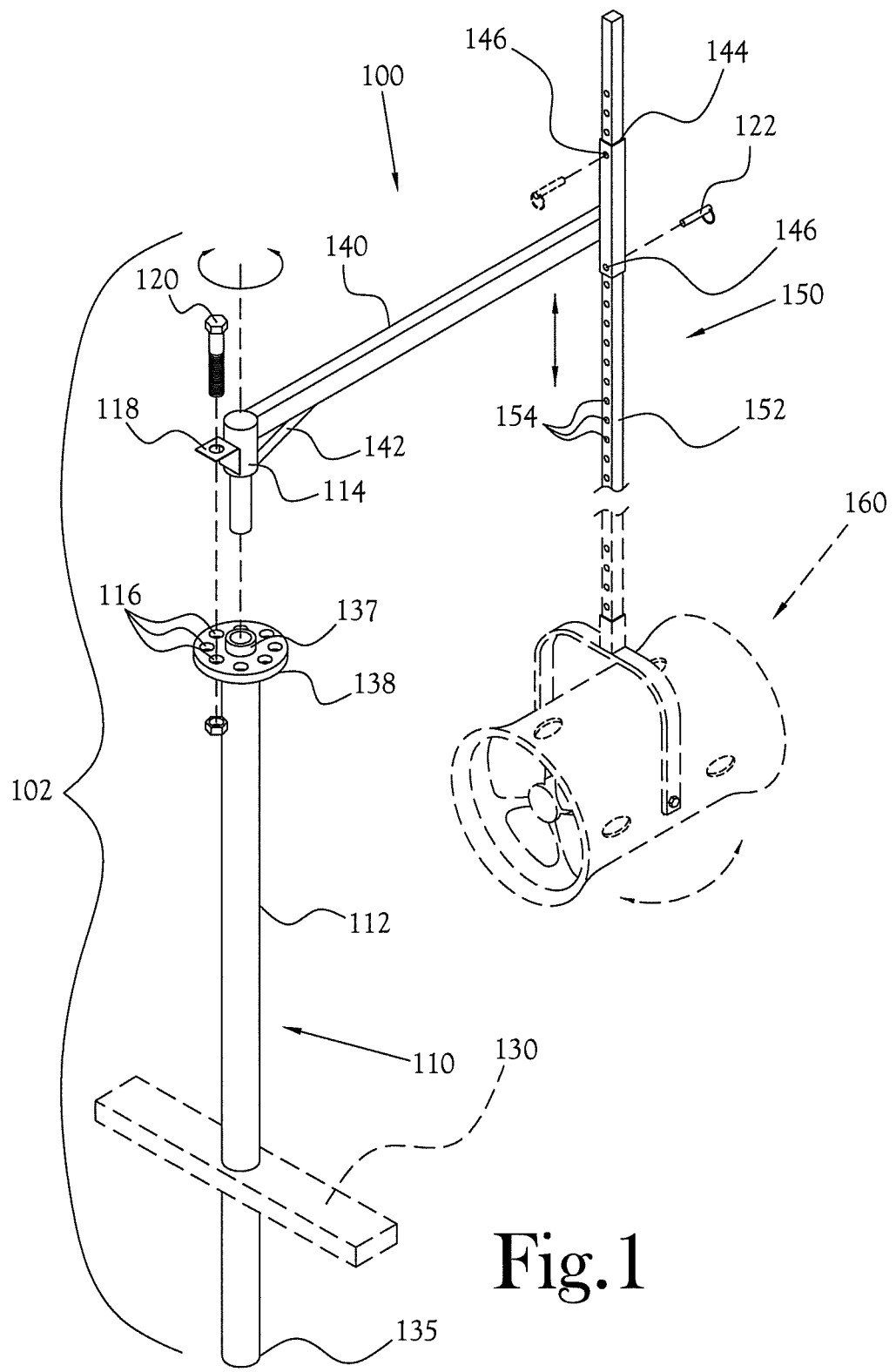
FIG. 1 represents a de-icing apparatus for de-icing a surface area of an open body of water.

FIG. 1 represents a de-icing apparatus 100 for de-icing a surface area of an open body of water. The de-icing apparatus 100 includes an anchorable stand 102 and a water movement device 160. The anchorable stand 102 includes a fixed-height vertical member 110, a cross bar 140, an adjustable-height vertical member 150, and may optionally include an anchoring cross-member 130 attached to the vertical member 110. The cross bar 140 attaches the fixed-height vertical member 110 to the adjustable-height vertical member 150.

The fixed-height vertical member 110 includes an anchoring member 112 having an anchoring end 135 that may be sunk into the mud, gravel, or other material forming the bottom of the open body of water to a depth to hold the water movement device 160 below, or preferably partially above and partially below the surface of the open body of water. The fixed-height vertical member 110 may include an anchoring cross member 130 attached above the anchoring end 135 of the anchoring member 112. The anchoring end 135 of the anchoring member 112 may be sunk in the bottom of the open body of water so the optional anchoring cross member 130 is in the bottom or on the surface of the bottom to further reduce the possibility that the anchoring member 112 will rotate during use of the de-icing apparatus 100.

The anchoring member 112 also includes a rotating member receiving end 137 having fixed attachment points 116. The fixed attachment points 116 may be provided by a disk 138 attached at the rotating member receiving end 137 of the anchoring member 112. The disk 138 is preferably circular in shape and substantially perpendicular to the longitudinal dimension of the anchoring member 112. However, the disk 138 could be square in shape and have additional orientations as long as the fixed attachment points 116 are provided. The fixed attachment points 116 may be provided by holes through the top and bottom surfaces of the disk 138. However, the fixed attachment points 116 may take forms other than holes, such as indentations in the top surface of the disk 138, spaces between protrusions from the anchoring member 112, and the like.

The fixed-height vertical member 110 also includes a rotating member 114. The rotating member 114 includes an outside dimension smaller than an inside dimension of the anchoring member 112. Preferably the outside dimension of the rotating member 114 and the inside dimension of the anchoring member 112 are diameters. The rotating member 114 slides inside of and is constrained in the downward vertical direction by the anchoring member 112. Preferably, the anchoring member 112 and the rotating member 114 are tubular in shape.

The rotating member 114 includes a rotating attachment point 118 to fix the rotational position of the rotating member 114. When the rotating attachment point 118 is aligned with one of the fixed attachment points 116, a first location holder 120 may be passed through the rotating attachment point 118 and through one of the fixed attachment points 116 to prevent rotation of the rotating member 114 about the anchoring member 112 of the fixed-height vertical member 110. The first location holder 120 may take the form of a smooth pin (not shown), a threaded bolt with a nut, and the like to prevent rotational movement of the rotating member 114 about the anchoring member 112.

The rotating member 114 may include an angular support 142 attached to the cross bar 140 that provides additional mechanical support to maintain attachment of the rotating member 114 to the cross bar 140 and to assist in maintaining the substantially horizontal orientation of the cross bar 140 during use of the de-icing apparatus 100.

The adjustable-height vertical member 150 includes a fixed receiver 144 having at least one vertically-fixed attachment point 146 to the cross bar 140 and a movable rod 152 including multiple vertically-movable attachment points 154. The movable rod 152 is configured to pass through the fixed receiver 144. As rotation of the movable rod 152 in relation to the fixed receiver 144 is undesirable, the movable rod 152 and the fixed receiver 144 may be shaped to prevent rotation. Thus they may be square, rectangular, triangular, star-shaped and the like so that when the movable rod 152 is passed though the fixed receiver 144, the movable rod is impinged in the rotational direction. The movable rod 152 and the fixed receiver 144 are preferably hollow in the longitudinal direction, but the movable rod 152 may be solid.

The at least one vertically-fixed attachment point 146 may be provided by a hole through the fixed receiver 144 that may be aligned with one of the vertically-movable attachment points 154. If more than one vertically-fixed attachment point 146 is used, then multiple holes through the fixed receiver 144 may be aligned with more than one of the vertically-movable attachment points 154. The vertically-movable attachment points 154 may be provided my multiple holes through the movable rod 152. Although less preferred, the vertically-fixed attachment point 146 could have the shape of a "U", thus allowing alignment with one of the vertically-movable attachment points 154.

When the at least one vertically-fixed attachment point 146 is aligned with one of the vertically-movable attachment points 154, a second location holder 122 may be passed through the at least one vertically-fixed attachment point 146 and through one of the vertically-movable attachment points 154 to prevent vertical movement of the movable rod 152 in relation to the fixed receiver 144. The second location holder 122 may take the form of a smooth pin, a threaded bolt with a nut (not shown), and the like to prevent vertical movement of the movable rod 152 in relation to the fixed receiver 144. If the vertically-fixed attachment point 146 was in the shape of a "U" as opposed to a "hole", then upward vertical movement of the movable rod 152 could occur while downward movement of the movable rod 152 in relation to the fixed receiver 144 would be stopped. Optionally, additional location holders may be used. The second location holder 122 also may operate to prevent rotation of the movable rod 152 in relation to the fixed receiver 144, in the event the movable rod 152 and the fixed receiver 144 are not shaped to prevent rotation.

Figure 2A:
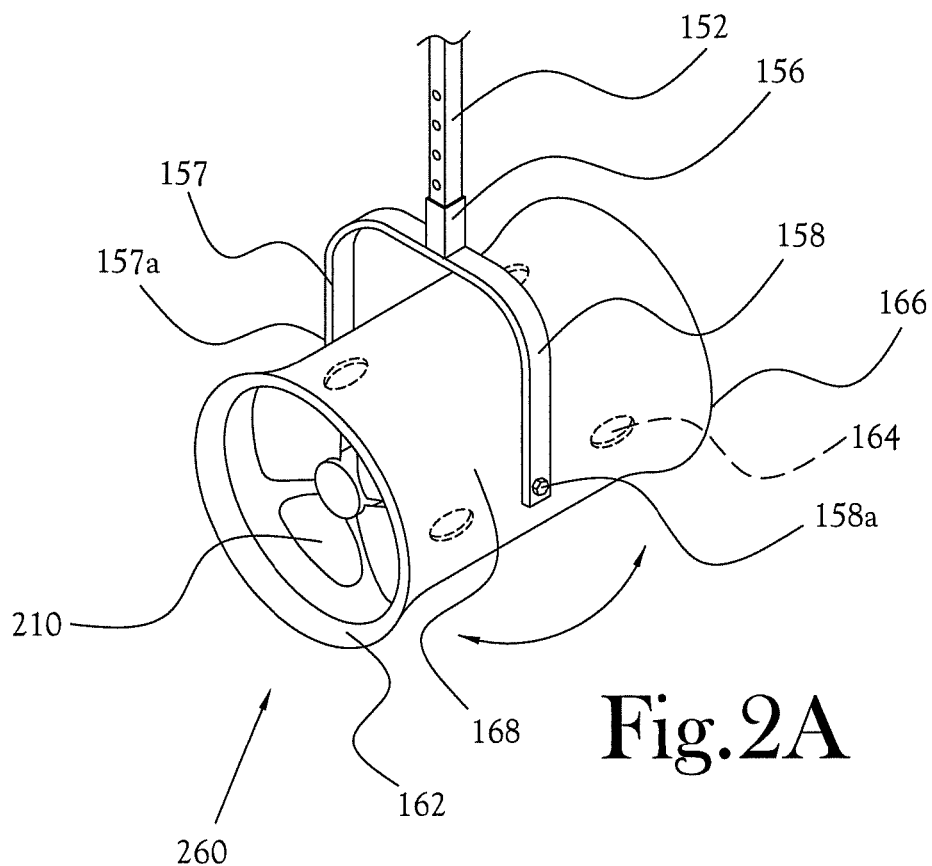
FIG. 2A represents a housing-tilting version of the water movement device.

FIG. 2A represents a housing-tilting version 260 of the water movement device 160. The housing-tiling water movement device 260 attaches to the movable rod 152 by a fork-arm 156 attached to a lower end of the movable rod 152. The fork-arm 156 includes a first arm 157 that terminates in a first vertical rotation point 157A and a second arm 158 that terminates in a second vertical rotation point 158A. The vertical rotation points 157A, 158A may be in the form of holes through the first and second arms 157, 158 and through opposing sides of housing 168. The water movement device 160 is attached to the first and second arms 157, 158 at the first and second vertical rotation points 157A, 158A. Bolts, rivets, pins and the like may be passed through the arms 157, 158 and through the housing 168 to form the vertical rotation points 157A, 158A. Other mechanical attachments that provide for vertical rotation of housing 168 may be used.

When propeller 210 driven by an electric motor internal to the housing 168 rotates, water moves from intake 162 to outlet 166 of the housing 168. Optional housing vents 164 may be present behind and/or in front of the propeller 210 to provide additional intake or output of water, respectively. In this way, water is circulated though the housing 168 to maintain a defrosted surface area of the open body of water.

Figure 2B:
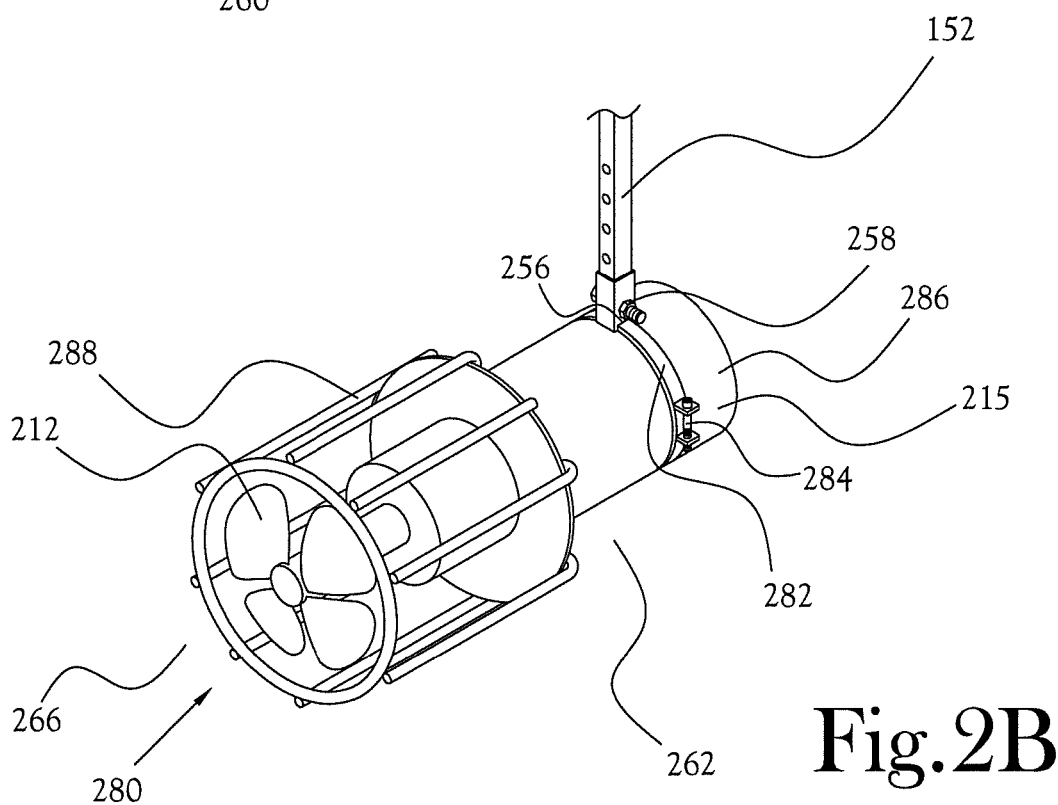
FIG. 2B represents a motor-tilting version of the water movement device.

FIG. 2B represents a motor-tilting version 280 of the water movement device 160. The motor-tilting water movement device 280 attaches to the lower end of the movable rod 152 by a vertical rotation point 258 formed from a hole through the movable rod 152 and an aligning hole in an attachment member 256 that is attached to a diameter contracting member 282. The attachment member 256 may be a bracket having a general "U" shape and configured to be slightly wider than the movable rod 152. The diameter of the diameter contracting member 282 may be increased or decreased to hold drive motor 215 when tensioner 284 is adjusted. The tensioner 284 may be a threaded bolt or other device that increases or decreases the diameter of the diameter contracting member 282 in response to mechanical movement of one or more parts.

When propeller 212 is driven by the drive motor 215, water moves from intake area 262 to outlet area 266. Protective cage 288 prevents large debris, aquatic life, and other waterborne species from damaging the propeller 212. In this way, water is circulated though the protective cage 288 to maintain a defrosted surface area of the open body of water.

Figure 3:
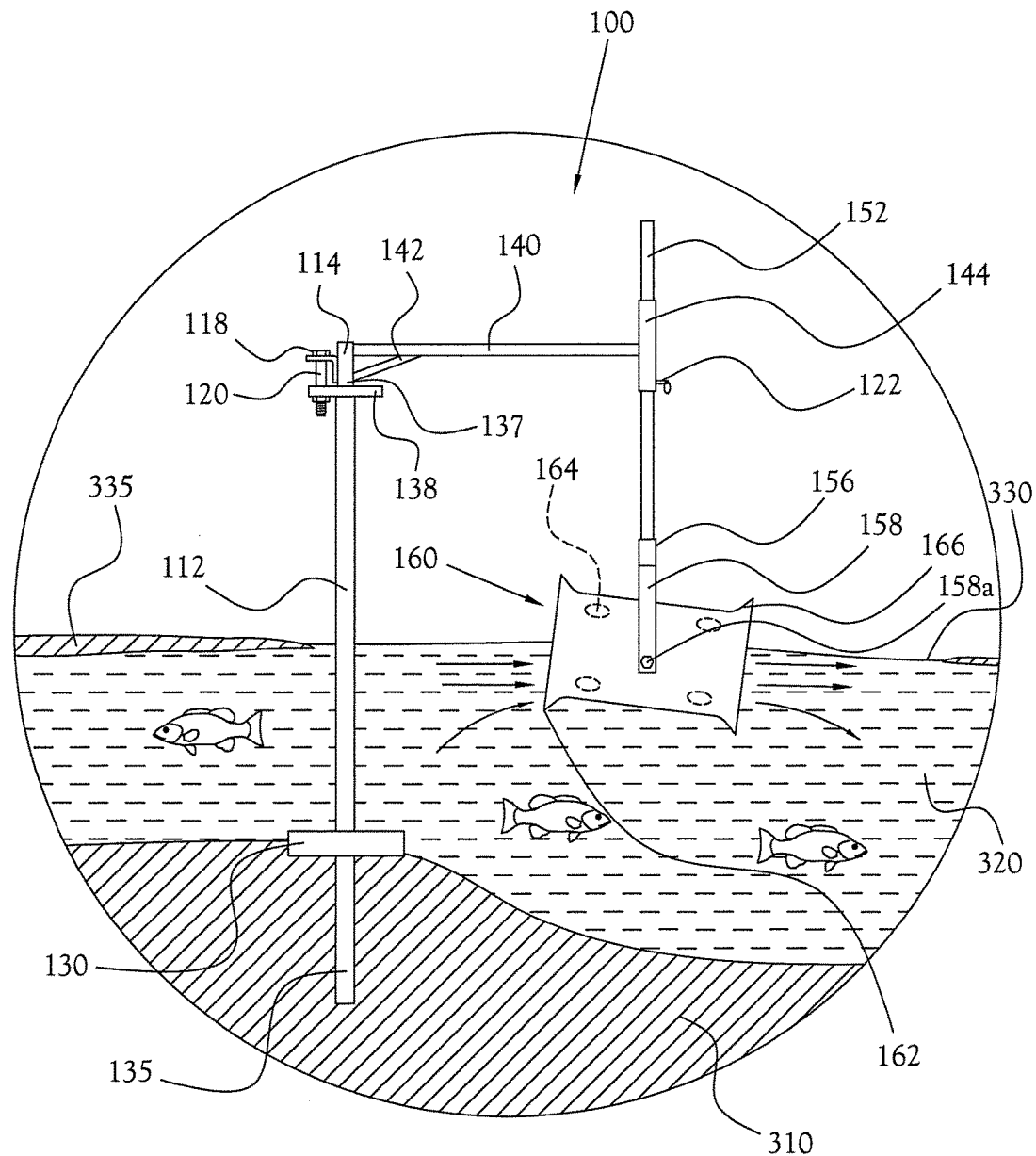
FIG. 3 represents the de-icing apparatus during de-icing a surface area having ice of an open body of water.

FIG. 3 represents the de-icing apparatus 100 during de-icing a surface area 330 having ice 335 of an open body of water 320. The de-icing apparatus 100 is driven into lake bottom 310 and is held by the anchoring end 135. The de-icing apparatus 100 may be further held in the lake bottom 310 by the optional anchoring cross member 130. In use, the drive motor is electrically energized to move water from an inlet or inlet area to an outlet or outlet area of the water movement device 160. In FIG. 3 the water movement device 160 is represented by the housing-tilting version 260, however the motor-tilting version 280 also may be used. The vertical rotation point or points of the de-icing apparatus 100 allow for tilting of the water movement device 160 without placing a hand in the water to alter the de-icing water flow to provide the desired de-icing pattern of the surface water.

While various embodiments of the invention are described, it will be apparent to those of ordinary skill in the art that other embodiments and implementations are possible within the scope of the invention. Accordingly, the invention is not to be restricted except in light of the attached claims and their equivalents.

What is claimed is:

1. A de-icing apparatus for de-icing a surface area of water, the apparatus comprising:
    an anchorable stand, the anchorable stand comprising:
        a fixed-height vertical member, the fixed-height vertical member including an anchoring member and a rotating member, where
            the anchoring member including an anchoring end and a rotating member receiving end, where the rotating member receiving end of the anchoring member includes fixed attachment points, and where
            the rotating member having an outside dimension smaller than an inside dimension of the anchoring member, the rotating member including a rotating attachment point;
        an adjustable-height vertical member attached to the fixed-height vertical member with a cross bar, the adjustable-height vertical member including a fixed receiver and a movable rod, the fixed receiver including at least one vertically-fixed attachment point and the movable rod including vertically-movable attachment points; and
    a water movement device attached to the anchorable stand through the movable rod,
    where the fixed attachment points of the rotating member receiving end of the anchoring member are provided by a disk attached to the anchoring member.

2. The apparatus of claim 1, further comprising an anchoring cross-member at the anchoring end of the anchoring member.

3. The apparatus of claim 1, further comprising a first location holder passing through a fixed attachment point of the fixed attachment points of the disk and the rotating attachment point of the rotating member.

4. The apparatus of claim 1, further comprising a second location holder passing through a vertically-fixed attachment point of the vertically fixed attachment points of the fixed receiver and a vertically-movable attachment point of the vertically-movable attachment points of the movable rod.

5. The apparatus of claim 1, further comprising an angular support between the rotating member and the cross bar.

6. The apparatus of claim 1, where the movable rod is configured to pass through the fixed receiver.

7. The apparatus of claim 6, where the movable rod and the fixed receiver are square in shape and the movable rod is hollow longitudinally.

8. The apparatus of claim 1, where the disk includes holes passing through a top surface and a bottom surface of the disk, the holes forming the fixed attachment points.

9. The apparatus of claim 8, where the top and bottom surfaces of the disk are perpendicular to a longitudinal dimension of the anchoring member.

10. The apparatus of claim 1, where the outside dimension of the rotating member and the inside dimension of the anchoring member are diameters.

11. The apparatus of claim 1, where the rotating member is configured to slide into and rotate within the anchoring member.

12. The apparatus of claim 1, where the anchoring member and the rotating member are tubular in shape.

13. The apparatus of claim 1, further comprising a fork-arm attached to a lower end of the movable rod, the fork-arm including a first arm including a first vertical rotation point and a second arm including a second vertical rotation point, where the water movement device attached to the movable rod through the first and second vertical rotation points of the fork-arm.

14. The apparatus of claim 13, where the water movement device includes a cylindrically-shaped housing attached to the first and second vertical rotation points of the fork-arm.

15. The apparatus of claim 14, where the cylindrically-shaped housing includes a propeller rotatably mounted within the housing on a drive motor, where the drive motor is attached to the housing.

16. The apparatus of claim 1, further comprising a vertical rotation point attached to a lower end of the movable rod, where the vertical rotation point attaches a diameter contracting member to the lower end of the movable rod.

17. The apparatus of claim 16, where the water movement device includes a propeller rotatably mounted on a drive motor, the drive motor held by the diameter contracting member.

* * * * *